United States Patent
Bhattacharjya et al.

(10) Patent No.: US 9,766,618 B2
(45) Date of Patent: Sep. 19, 2017

(54) GENERATING WORK PRODUCT PLANS SPECIFYING PROPORTIONS OF CONSTITUENTS TO BE USED IN FORMING A WORK PRODUCT

(71) Applicant: International Business Machines Corporation, Armonk, NY (US)

(72) Inventors: Debarun Bhattacharjya, Ossining, NY (US); Florian Pinel, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 14/459,903

(22) Filed: Aug. 14, 2014

(65) Prior Publication Data

US 2016/0048126 A1     Feb. 18, 2016

(51) Int. Cl.
    G06F 19/00    (2011.01)
    G05B 19/418   (2006.01)

(52) U.S. Cl.
    CPC ............ *G05B 19/41865* (2013.01); *G05B 2219/32082* (2013.01); *Y02P 90/20* (2015.11)

(58) Field of Classification Search
    None
    See application file for complete search history.

(56) References Cited

U.S. PATENT DOCUMENTS

| | | | | |
|---|---|---|---|---|
| 5,986,219 A | * | 11/1999 | Carroll | G06Q 10/087 177/1 |
| 6,183,644 B1 | * | 2/2001 | Adams | C02F 3/2806 210/611 |
| 7,930,200 B1 | * | 4/2011 | McGuirk | G06Q 30/02 705/1.1 |
| 9,489,377 B1 | * | 11/2016 | Feller | G06F 17/2785 |

(Continued)

OTHER PUBLICATIONS

M. Mizukoshi, "Model Studies of Cake Baking. VI. Effects of Cake Ingredients and Cake Formula on Shear Modulus of Cake," Cereal Chemists, Jan. 1985, pp. 247-251, vol. 62, No. 4.

(Continued)

*Primary Examiner* — Adam Lee
(74) *Attorney, Agent, or Firm* — Louis J. Percello; Ryan, Mason & Lewis, LLP

(57) ABSTRACT

A method includes receiving a given work product plan specifying a set of constituents to be used in forming a given work product, each constituent having one or more properties, the given work product being associated with a given class of work products. The method also includes obtaining information associated with one or more existing work product plans for one or more existing work products in the given class from a knowledge database and selecting proportions of the set of constituents to be used in forming the given work product based at least in part on distributions of characteristics associated with types of constituents used in forming existing work products in the given class and of properties of constituents used in forming existing work (Continued)

products in the given class. The method further includes generating an updated work product plan for the given work product specifying the selected proportions of the set of constituents to be used in forming the given work product.

20 Claims, 5 Drawing Sheets

(56) References Cited

U.S. PATENT DOCUMENTS

| | | | | |
|---|---|---|---|---|
| 2002/0090442 | A1* | 7/2002 | Haeffner | G01N 21/359 426/623 |
| 2004/0139106 | A1* | 7/2004 | Bachman | G06F 17/30864 |
| 2005/0129835 | A1* | 6/2005 | Delahanty | A23G 9/38 426/656 |
| 2006/0081653 | A1* | 4/2006 | Boland | A47J 31/40 222/243 |
| 2007/0143126 | A1* | 6/2007 | Ghose | G06F 19/3475 434/127 |
| 2007/0168057 | A1* | 7/2007 | Blevins | G05B 13/022 700/53 |
| 2007/0191257 | A1* | 8/2007 | Andretta | A61Q 13/00 512/1 |
| 2007/0228068 | A1* | 10/2007 | Schneider | G06Q 10/087 222/1 |
| 2009/0069934 | A1* | 3/2009 | Newman | B67D 1/0021 700/239 |
| 2010/0191361 | A1* | 7/2010 | McCready | G05B 13/048 700/104 |
| 2012/0101893 | A1* | 4/2012 | Tsai | G06Q 30/0207 705/14.35 |
| 2012/0107921 | A1* | 5/2012 | Willson | A01G 7/02 435/286.5 |
| 2012/0116915 | A1* | 5/2012 | Zheng | G06Q 50/01 705/26.7 |
| 2013/0097002 | A1* | 4/2013 | Dishneau | G06Q 30/0255 705/14.25 |
| 2013/0132140 | A1* | 5/2013 | Amin | G06Q 10/02 705/7.13 |
| 2013/0216296 | A1* | 8/2013 | Kusin | A45D 34/00 401/267 |
| 2013/0295531 | A1* | 11/2013 | Addanki | G09B 19/0092 434/127 |
| 2014/0011165 | A1* | 1/2014 | Childress | G09B 19/0092 434/127 |
| 2014/0018943 | A1* | 1/2014 | Lee | B65D 83/0011 700/90 |
| 2014/0052722 | A1* | 2/2014 | Bertsimas | G06F 19/3475 707/733 |
| 2014/0170273 | A1* | 6/2014 | Higbie, Jr. | G06Q 10/043 426/231 |
| 2014/0321714 | A1* | 10/2014 | Masten | G06K 9/00657 382/110 |
| 2014/0324490 | A1* | 10/2014 | Gurin | G06Q 10/0631 705/7.12 |
| 2015/0059790 | A1* | 3/2015 | Sandow | A45D 34/041 132/200 |
| 2015/0170001 | A1* | 6/2015 | Rabinovich | G06K 9/66 382/110 |
| 2015/0320254 | A1* | 11/2015 | Perentes | A47J 31/22 426/232 |
| 2016/0110423 | A1* | 4/2016 | Uchida | G06Q 50/12 707/771 |

OTHER PUBLICATIONS

R.G. Morris et al., "Soup Over Bean of Pure Joy: Culinary Ruminations of an Artificial Chef," Third International Conference on Computational Creativity, May 2012, pp. 119-125, Dublin, Ireland.
U.S. Appl. No. 13/847,099 filed in the name of F. Pinel et al. on Mar. 19, 2013 and entitled "Automated Generation of New Work Products and Work Plans."

* cited by examiner

*FIG. 3*
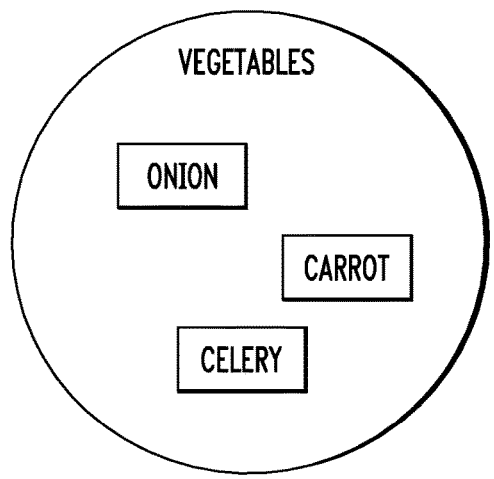
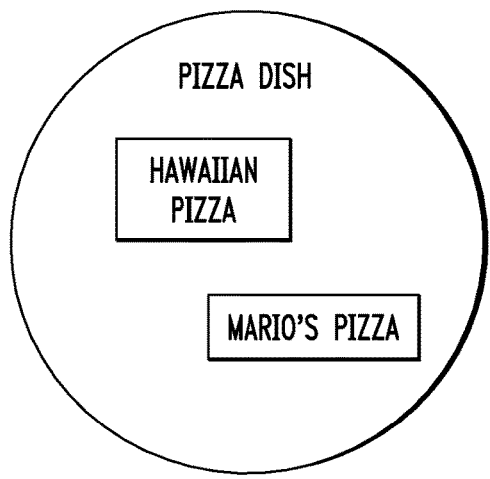
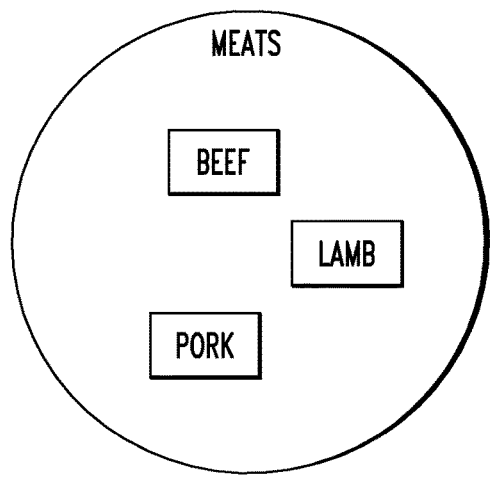
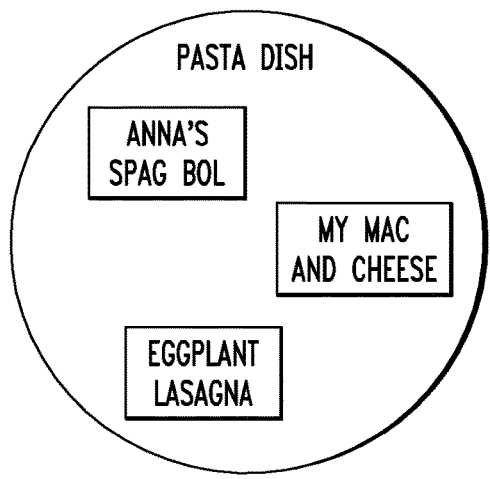
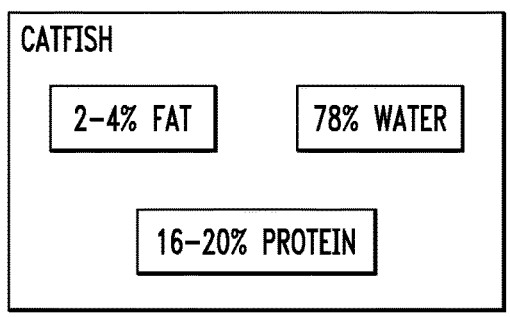

GENERATING WORK PRODUCT PLANS SPECIFYING PROPORTIONS OF CONSTITUENTS TO BE USED IN FORMING A WORK PRODUCT

BACKGROUND

The present invention relates to computational creativity, and more specifically, to generation of work products and work product plans. Work product plans specify constituents to be used in forming a work product. As an example, a recipe is a work product plan specifying ingredients to be used in forming a food dish work product. Businesses and other entities often have a set of work products which are offered for sale or used within an entity. Entities may desire to use new and/or different work products over time, which typically require generation of novel work product plans.

SUMMARY

According to one embodiment of the present invention, a method comprises receiving a given work product plan specifying a set of constituents to be used in forming a given work product, each constituent having one or more properties, the given work product being associated with a given class of work products, obtaining information associated with one or more existing work product plans for one or more existing work products in the given class from a knowledge database, selecting proportions of the set of constituents to be used in forming the given work product based at least in part on distributions of characteristics associated with types of constituents used in forming existing work products in the given class and of properties of constituents used in forming existing work products in the given class, and generating an updated work product plan for the given work product specifying the selected proportions of the set of constituents to be used in forming the given work product. The receiving, obtaining, selecting and generating are performed by at least one processing device comprising a processor coupled to a memory.

According to another embodiment of the invention, an article of manufacture comprises a computer readable storage medium for storing computer readable program code. The computer readable program code, when executed, causes a computer to receive a given work product plan specifying a set of constituents to be used in forming a given work product, each constituent having one or more properties, the given work product being associated with a given class of work products, obtain information associated with one or more existing work product plans for one or more existing work products in the given class from a knowledge database, select proportions of the set of constituents to be used in forming the given work product based at least in part on distributions of characteristics associated with types of constituents used in forming existing work products in the given class and of properties of constituents used in forming existing work products in the given class, and generate an updated work product plan for the given work product specifying the selected proportions of the set of constituents to be used in forming the given work product.

According to another embodiment of the invention, an apparatus comprises a memory and a processor device operatively coupled to the memory. The processor device is configured to implement an input module configured to receive a given work product plan specifying a set of constituents to be used in forming a given work product, each constituent having one or more properties, the given work product being associated with a given class of work products, a work product analysis module configured to obtain information associated with one or more existing work product plans for one or more existing work products in the given class from a knowledge database, a proportion balancing module configured to select proportions of the set of constituents to be used in forming the given work product based at least in part on distributions of characteristics associated with types of constituents used in forming existing work products in the given class and of properties of constituents used in forming existing work products in the given class, and an output module configured to generate an updated work product plan for the given work product specifying the selected proportions of the set of constituents to be used in forming the given work product.

These and other embodiments of the invention will become apparent from the following detailed description of illustrative embodiments thereof, which is to be read in connection with the accompanying drawings.

BRIEF DESCRIPTION OF THE SEVERAL VIEWS OF THE DRAWINGS

FIG. 3 depicts an example of ingredient clustering, recipe clustering and nutrient composition information according to an embodiment of the invention.

DETAILED DESCRIPTION

Figure 1:
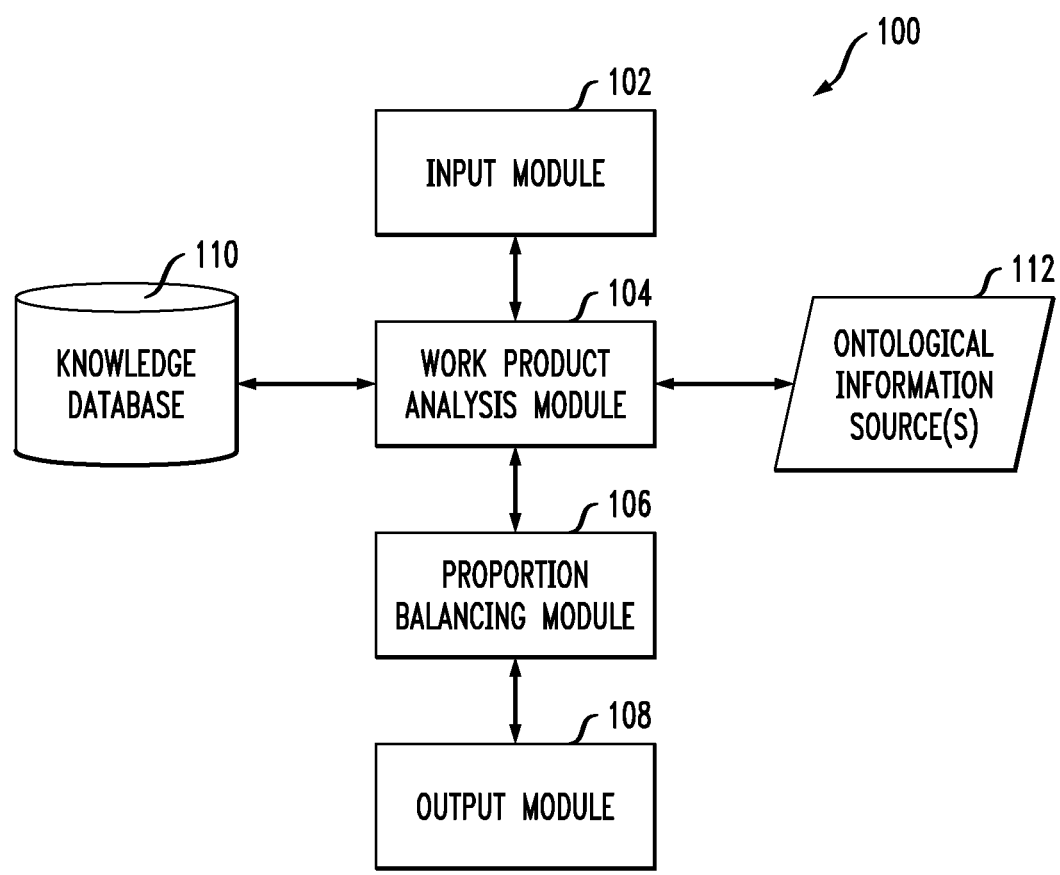
FIG. 1 depicts a system for generation of work product plans according to an embodiment of the invention.

Illustrative embodiments of the invention may be described herein in the context of illustrative methods, systems and devices for generation of work product plans. However, it is to be understood that embodiments of the invention are not limited to the illustrative methods, systems and devices described but instead are more broadly applicable to other suitable methods, systems and devices.

As used herein, the term "work product" is used to refer to a material or abstract object. Work products include manufactured goods such as electronic circuits, food products, and pharmaceuticals, as well as culinary recipes, menus, complex travel itineraries, financial portfolios, catalogs, perfumes, etc. Some work products are also work product plans, in that they include a process that realizes another work product. For example, a culinary recipe is both a work product and a work product plan for creating another work product, namely, a food dish. In addition, one work product may comprise other work products. For example, a menu is an example of a work product which may include other work products such as food dishes or recipes.

As used herein, the term "constituent" is used to refer to components used or to be used in forming a work product. As an example, a recipe includes a list of ingredients to be used in making a food dish. In this example, the ingredients are constituents of the recipe. As another example, a complex travel itinerary includes a number of events, such as visiting historical sites, parks, museums, restaurants, etc.

Each event may be considered a constituent of the travel itinerary. As a further example, a perfume is a mixture of different fragrances or odor sources. Each fragrance or odor source is a constituent of the perfume. Numerous other examples are possible.

Embodiments of the invention provide systems, devices and methods which allow for generation of work product plans. In some embodiments, a work product plan is received which specifies a set of constituents to use in forming a work product but which does not specify or is missing some or all information relating to the proportions or amounts of constituents to be used in forming the work product. Embodiments use information associated with existing work products and constituent properties to select the proportions of constituents for a new or updated work product plan.

Computational creativity techniques may be used to generate novel work products and work product plans. Exemplary techniques for such creative generation of work products and work product plans are described in U.S. patent application Ser. No. 13/847,099, filed Mar. 19, 2013 and entitled "Automated Generation of New Work Products and Work Plans," which is commonly assigned herewith and incorporated by reference herein.

A novel work product plan may specify a novel combination of constituents without specifying exact amounts or proportions of constituents to be used in forming a novel work product. In addition, an existing work product plan may be missing all or some portion of information specifying the amounts or proportions of constituents to be used in forming an existing work product.

FIG. 1 illustrates a system 100 for generation of work product plans. The system 100 includes an input module 102, work product analysis module 104, proportion balancing module 106, output module 108, knowledge database 110 and ontological information sources 112. As will be described in further detail blow, each of the modules shown in system 100 may be implemented using hardware, software or a combination of hardware and software running on one or more computing or other processing devices.

As shown in FIG. 1, the work product analysis module 104 is connected to knowledge database 110 and ontological information sources 112. The work product analysis module 104 is configured to query or otherwise exchange information with the knowledge database 110 and ontological information sources 112. While not explicitly shown in FIG. 1, the input module 102, proportion balancing module 106 and output module 108 may also be connected to knowledge database 110 and/or ontological information sources 112 in some embodiments. In addition, although shown as separate in FIG. 1, the knowledge database 110 and ontological information sources 112 may in some embodiments be combined.

The knowledge database 110 stores information relating to existing work products, constituents and constituent properties. This information may include lists of constituents used in forming existing work products, statistical analysis of clusters of existing work products and constituents and their respective properties, user evaluation and feedback information for existing work products, etc. Ontological information sources 112 store information relating to ontologies for existing work products and constituents as well as their properties.

Figure 2:
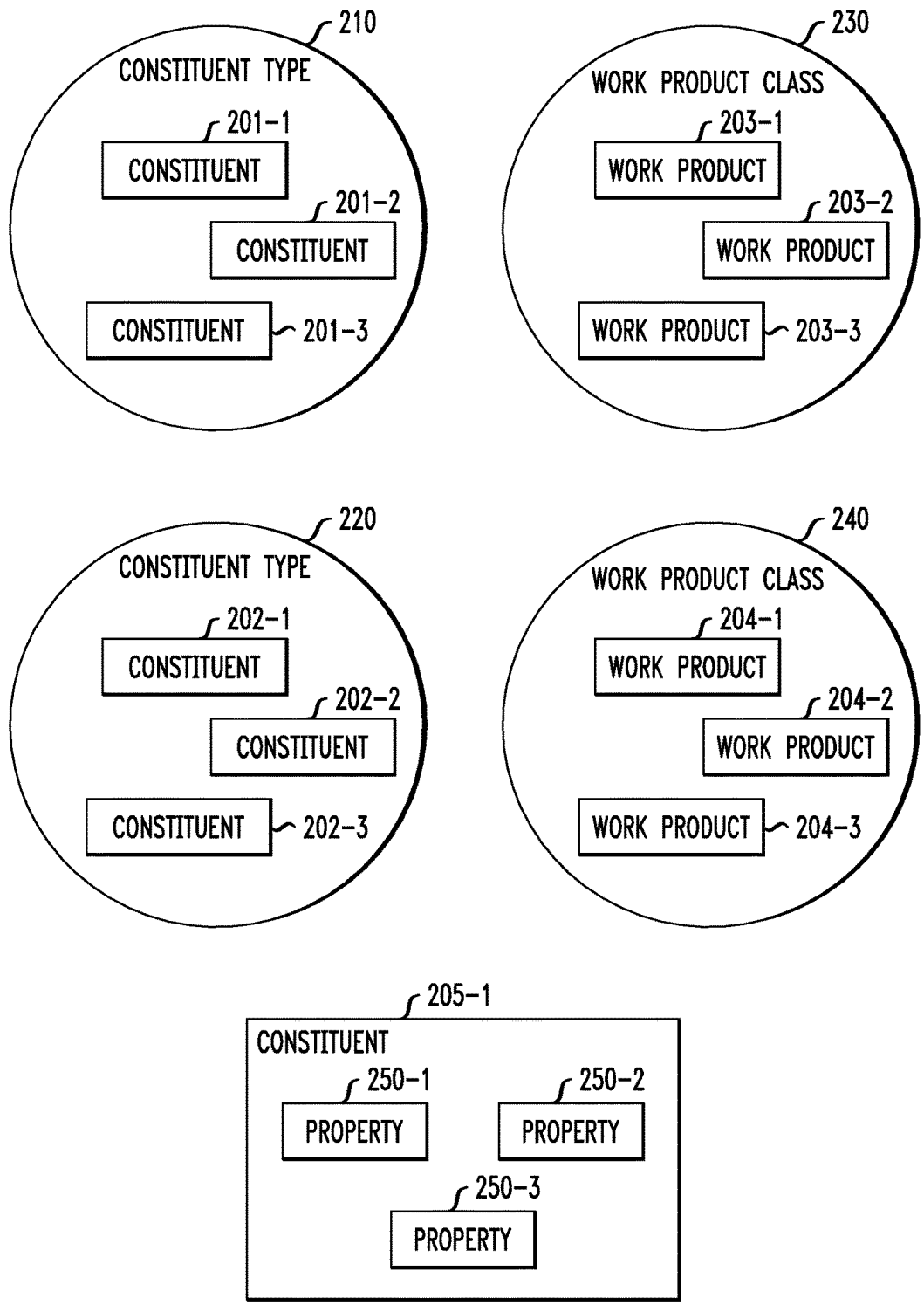
FIG. 2 depicts an example of constituent clustering, work product clustering and constituent property information according to an embodiment of the invention.

FIG. 2 illustrates examples of constituent clustering, work product clustering and constituent properties in knowledge database 110. In FIG. 2, constituents are clustered into constituent types 210 and 220 and work products are clustered into work product class 230 and work product class 240. Constituent type 210 includes constituents 201-1, 201-2 and 201-3, while constituent type 220 includes constituents 202-1, 202-2 and 202-3. Work product class 230 includes work products 203-1, 203-2 and 203-3, while work product class 240 includes work products 204-1, 204-2 and 204-3. FIG. 2 also shows properties of a constituent 205-1. The constituent 205-1 has properties 250-1, 250-2 and 250-3.

Although FIG. 2 shows constituent types 210 and 220 as clusters of three constituents, embodiments are not so limited. Constituent types 210 and 220 may be clusters of more or less than three constituents each. Similarly, work product classes 230 and 240 may by clusters of more or less than three work products and a constituent 205-1 may have more or less than three properties. Also, knowledge database 110 may include more or fewer than two clusters of constituent types and work product classes. Further, the knowledge database 110 may include property information for a plurality of different constituents although only one, constituent 205-1, is shown in FIG. 2 for clarity of illustration.

FIG. 3 shows a specific example of information stored in knowledge database 110 relating to recipes. As shown in FIG. 3, the ingredients of onion, carrot and celery are clustered as vegetables while the ingredients of beef, lamb and pork are clustered as meats. Hawaiian Pizza and Mario's Pizza are clustered as pizza dishes, while Anna's Spag Bol, My Mac & Cheese and Eggplant Lasagna are clustered as pasta dishes. The ingredient catfish is shown as having 2-4% fat, 78% water and 16-20% protein. Such nutrient proportions are examples of constituent properties. Although the constituents and work products are shown in FIGS. 2 and 3 as belonging to only a single cluster, embodiments are not so limited. Instead, constituents and/or work products may be part of two or more clusters. As an example, Mario's Pizza and Anna's Spag Bol may also be clustered as Italian dishes.

Figure 4:
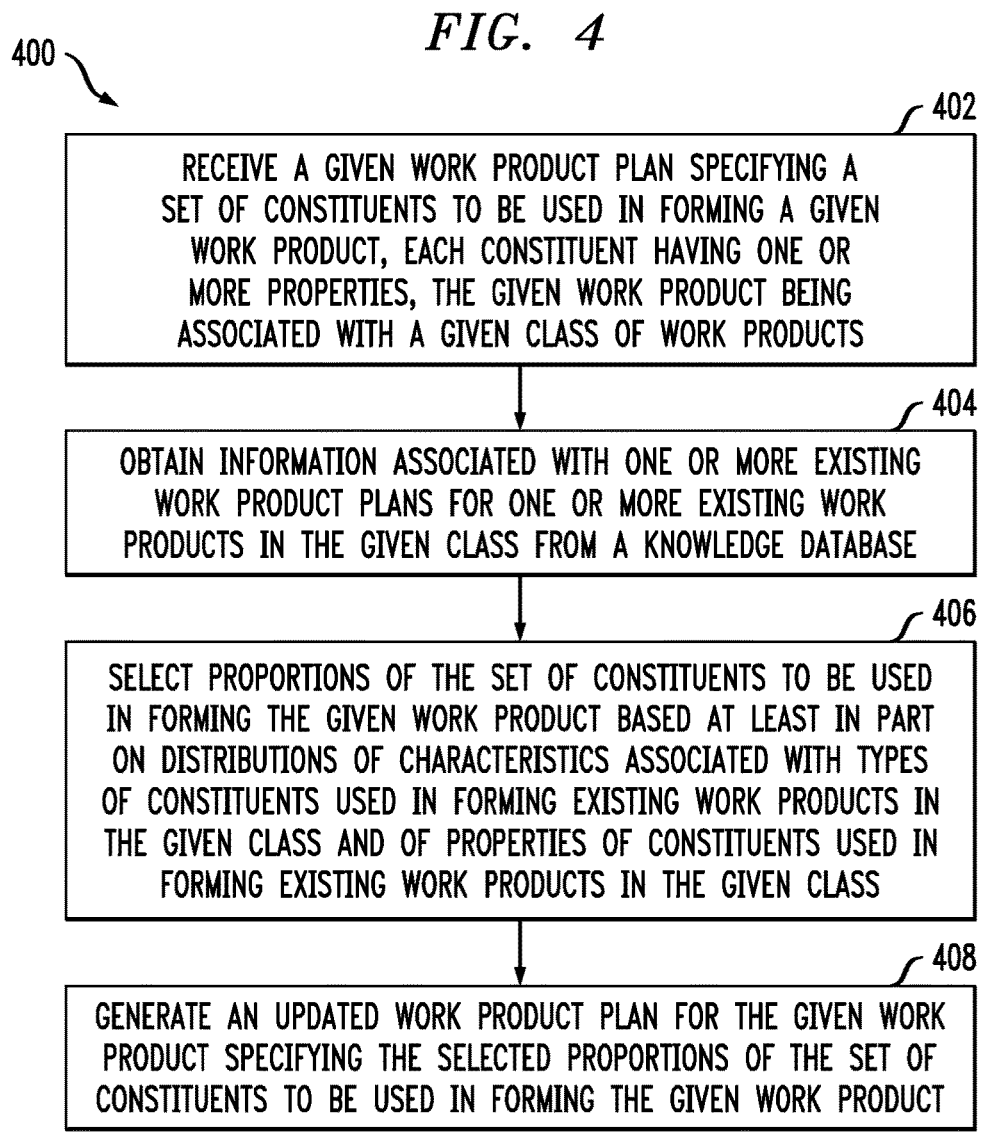
FIG. 4 depicts a process for generation of work product plans according to an embodiment of the invention.

FIG. 4 illustrates a process 400 for generation of work product plans which may be performed by system 100. The process 400 begins with receiving a given work product plan specifying a set of constituents to be used informing a given work product in block 402. The input module 102 in system 100 may be configured to perform block 402 in process 400. Each constituent in the set of constituents specified in the given work product plan has one or more properties, and the given work product is associated with a given class of work products. As an example, the given work product plan may be a recipe for a new dish which specifies a set of ingredients to be used in making the new dish but which does not include all or part of the amounts or proportions of the ingredients to be used in making the dish. The new dish is associated with a class of existing food dishes, and the ingredients used in the dish have certain properties such as nutrient information, taste profiles, etc.

Process 400 continues with obtaining information associated with one or more existing work product plans for one or more existing work products in the given class from a knowledge database in block 404. The work product analysis module 104 in system 100 may be configured to perform block 404 in the process 400 using information stored in knowledge database 110. As discussed above, the information associated with existing work product plans, work products and constituents may be clustered by work product class and constituent type. The knowledge database 110, as discussed above, may include statistical information on such clusters, including average percentages and standard deviations for constituent types, properties of constituents, work products and work product plans.

Using information obtained in block 404, the FIG. 4 process continues with selecting proportions of the set of constituents to be used in forming the given work product based at least in part on distributions of characteristics associated with types of constituents used in forming existing work products in the given class and of properties of constituents used in forming existing work products in the given class. The proportion balancing module 106 in system 100 may be configured to perform block 406 in process 400. The distributions may include average percentages and standard deviations of constituent types, properties of constituents, work products and work product plans obtained from or otherwise determined from information in the knowledge database 110.

Continuing with the example above, the proportion balancing module 106 may seek to select ingredient proportions of the new recipe such that the proportions of each nutrient, e.g., proteins, fats, carbs, etc., and each ingredient type, e.g., meats, vegetables, herbs, dairy, etc., approximately conform to distributions of such proportions in existing recipes for food dishes in the same or similar classes. The importance of one or more particular nutrients or ingredient types, or more generally the importance of constituent properties and constituent types, may be inversely proportional to its respective standard deviation. This is based on a rationale used in some embodiments that the composition of the new dish should conform more closely to existing dishes for those aspects of the existing dishes that exhibit little variation.

In addition to information obtained from knowledge database 110, the proportion balancing module 106 may use additional expertise, user feedback or other ontological information such as information obtained from ontological information sources 112 in performing the processing in block 406 of process 400.

Also, in some embodiments, particular constituent properties may be weighted relative to one another. In some contexts, particular ones of constituent properties may be more important than others. For example, in a diet recipe, the caloric properties of ingredients may be assigned a higher weight than taste or flavor properties of ingredients.

Further, the proportion balancing module 106 may only use some subset of a plurality of available types of constituent properties in performing the processing in block 406 of process 400. For example, ingredients may have properties such as nutrient compositions and flavor profiles. The proportion balancing module 106 may use only nutrient composition, only flavor profiles, or combinations of ingredient compositions and flavor profiles for selecting proportions of ingredients to be used in forming the new dish.

The proportion balancing module 106 may also utilize only a subset of the constituent properties for a given type. For example, certain nutrients that are irrelevant or of low importance for a given recipe may be ignored. The amounts of nutrients such as gluten, collagens, etc. may be important in certain types of recipes but irrelevant for other types of recipes. Certain chemical compounds may also be added to a list of nutrients in some embodiments. As an example, capsaicin, a compound used in measuring spiciness in the Scoville scale, may be used as a property for certain types of recipes. Certain nutrients may also be filtered out or classified as a higher-level category, e.g., collagens are a group of proteins.

In some embodiments, the given work product plan may include a constituent which is not present in existing work products of the given class. In such instances, substitution rules may be used by work product analysis module 104 and/or proportion balancing module 106. As an example, an ingredient type may be present in existing recipes but not in a new recipe for which proportions of ingredients needs to be determined. To resolve this issue, some embodiments merge ingredient types. If the new recipe, for example, contains seafood but no meat, the properties for meat and seafood proportions may be merged when considering existing recipes.

The proportion balancing module 106 may in some embodiments take into account a variety of constraints when performing the processing in block 406 of process 400. Such constraints include, by way of example, cost, scarcity and interdependence between constituents and constituent types. For example, let us assume that a new recipe calls for three different vegetables amongst its list of ingredients. Further, let us assume that the three different vegetables are somewhat interchangeable with respect to their proportions, i.e., the recipe may use 50% carrots, 25% celery and 25% onion or, alternatively, 25% carrots, 50% celery and 25% onion. In such cases, the choice of relative proportions of carrots and onions may be based on the cost or scarcity of such ingredients.

In some embodiments, a work product plan may include two or more separable components or sub-elements. For example, a recipe for apple pie may be separated into a dough component and a filling component. Portions of the process 400, including processing in block 406, may be performed for each component of a work product plan separately. As another example, the work product plan may be a menu of multiple dishes, each dish having its own recipe. The process 400 or portions thereof may be performed separately for each dish in the menu and for each component of each dish.

Process 400 concludes with generating an updated work product plan for the given work product specifying the selected portions of the set of constituents to be used in forming the given work product in block 408. The output module 108 in system 100 may be configured to perform the processing in block 408 of process 400. In some embodiments, generating the updated work product plan in block 408 further includes identifying amounts of the constituents to be used in forming the given work product. As will be described in further detail below, identifying the amounts of constituents in some embodiments involves computing average amounts of constituents used in forming existing work products in the given class and determining a multiplication factor for reaching the average amounts in the given work product using the selected proportions for the given work product.

In some embodiments of the process 400, the system 100 utilizes an objective function to select proportions of constituents to be used in forming a given work product. This may involve, for example, minimizing the objective function subject to one or more constraints. An example of such an objective function is described below in the context of selecting proportions of ingredients for a recipe, although the objective function can be adapted for use in a number of other contexts such as travel itinerary generation, catalog generation, perfume plan or template generation, etc.

The system 100 uses a number of parameters, decision variables and cost functions in the objective function described below. Such parameters include, by way of example, nutrients denoted $N_1, \ldots, N_p$, ingredients denoted $I_1, \ldots, I_m$, and ingredient types denoted $T_1, \ldots, T_q$. $c_{ij}$ represents the percentage of ingredient $I_i$ that consists of nutrient $N_j$, and $t_{ij}$ is a parameter indicating whether ingredient $I_i$ is of type $T_j$. For example, $t_{ij}$ is 1 if ingredient $I_i$ is of type $T_j$, otherwise $t_{ij}$ is 0. $\vec{\mu}=(\mu_1, \ldots, \mu_m)$ is used to denote a decision variable indicating the proportions of the ingredients in a new recipe R, expressed as percentages.

The work product analysis module 104 is configured to select all, or some number up to a specified threshold, of existing recipes in the same class as the new recipe. The existing recipes are denoted $R^{(1)}, \ldots, R^{(n)}$. For $R^{(1)}, \ldots, R^{(n)}$, the work product analysis module 104 computes or otherwise determines the average percentage $Y_j^{nutrient}$ and standard deviation $\sigma_j^{nutrient}$ of each nutrient $N_j$. The work product analysis module 104 also, for $R^{(1)}, \ldots, R^{(n)}$, computes or otherwise determines the average percentage $Y_j^{type}$ and standard deviation $\sigma_j^{type}$ of each ingredient type $T_j$. The work product analysis module 104 provides $Y_j^{nutrient}$, $\sigma_j^{nutrient}$, $Y_j^{type}$ and $\sigma_j^{type}$ to the proportion balancing module 106.

The proportion balancing module 106 selects proportions of ingredients to be used in the new recipe utilizing an objective function $$J(\vec{\mu}) = J^{nutrient}(\vec{\mu}) + J^{type}(\vec{\mu}) \tag{1}$$

where $\vec{\mu}=(\mu_1, \ldots, \mu_m)$ is the proportion of ingredients in the given recipe expressed as percentages, $J^{nutrient}(\vec{\mu})$ is a cost function for nutrients and $J^{type}(\vec{\mu})$ is a cost function for ingredient types. The objective function determines the proportions of ingredients to use in the new recipe by using the objective function $J(\vec{\mu})$ that conforms to distributions of each nutrient and ingredient type for existing recipes $R^{(1)}, \ldots, R^{(n)}$ in the same class as the new recipe. The cost functions $J^{nutrient}(\vec{\mu})$ and $J^{type}(\vec{\mu})$, as will be detailed below, penalize deviations from an average proportion. Penalty contributions, however, are smaller for those nutrients and ingredient types which show more variation in existing recipes $R^{(1)}, \ldots, R^{(n)}$.

The cost function for nutrients, $J^{nutrient}(\vec{\mu})$, is determined according to $$J^{nutrient}(\vec{\mu}) = \frac{1}{2p} \sum_{j=0}^{p} \left( 1 - \frac{\sigma_j^{nutrient}}{\sum_{k=0}^{p} \sigma_k^{nutrient}} \right) \left( \sum_{t=0}^{m} \mu_i c_{ij} - Y_j^{nutrient} \right). \tag{2}$$

$$1 - \frac{\sigma_j^{nutrient}}{\sum_{k=0}^{p} \sigma_k^{nutrient}}$$

is a penalty contribution which decreases as the variation for the nutrient increases.

$$\sum_{t=0}^{m} \mu_i c_{ij} - Y_j^{nutrient}$$

is a penalty contribution which increases as deviation from the average for the nutrient increases.

The cost function for ingredient types, $J^{type}(\vec{\mu})$, is determined according to $$J^{type}(\vec{\mu}) = \frac{1}{2q} \sum_{j=0}^{q} \left( 1 - \frac{\sigma_j^{type}}{\sum_{k=0}^{p} \sigma_k^{type}} \right) \left( \sum_{t=0}^{m} \mu_i t_{ij} - Y_j^{type} \right). \tag{3}$$

$$1 - \frac{\sigma_j^{type}}{\sum_{k=0}^{p} \sigma_k^{type}}$$

is a penalty contribution which decreases as variation for the ingredient type increases.

$$\sum_{t=0}^{m} \mu_i t_{ij} - Y_j^{type}$$

is a penalty contribution which increases as deviation from the average for the ingredient type increases.

In the example above, each of $J^{nutrient}(\vec{\mu})$ and $J^{type}(\vec{\mu})$ contribute equally to $J(\vec{\mu})$, as indicated by the ½ term in the equations (2) and (3). In some embodiments, the cost functions $J^{nutrient}(\vec{\mu})$ and $J^{type}(\vec{\mu})$ may be weighted differently. In some cases, conforming to nutrient distributions may be deemed more important than conforming to ingredient type distributions. Equation (2) and (3) may thus be altered according to $$J^{nutrient}(\vec{\mu}) = \frac{1}{(1-y)p} \sum_{j=0}^{p} \left( 1 - \frac{\sigma_j^{nutrient}}{\sum_{k=0}^{p} \sigma_k^{nutrient}} \right) \left( \sum_{t=0}^{m} \mu_i c_{ij} - Y_j^{nutrient} \right), \tag{2'}$$

$$J^{type}(\vec{\mu}) = \frac{1}{(y)q} \sum_{j=0}^{q} \left( 1 - \frac{\sigma_j^{type}}{\sum_{k=0}^{p} \sigma_k^{type}} \right) \left( \sum_{t=0}^{m} \mu_i t_{ij} - Y_j^{type} \right), \tag{3'}$$

where y is selected so as to adjust the weights or importance of the two cost functions. In the examples above, the equations (2) and (2') are based on averages for all p and the equations (3) and (3') are based on averages for all q. In other embodiments, however, individual nutrients and ingredient types may be assigned different weights. Such weights may be determined using a machine learning algorithm, such as using linear regression techniques.

Although the objective function $J(\vec{\mu})$ in equation (1) uses only two cost functions, in other embodiments $J(\vec{\mu})$ may use other cost functions in addition to or in place of $J^{nutrient}(\vec{\mu})$ and $J^{type}(\vec{\mu})$. By way of example, $J(\vec{\mu})$ may also use a cost function measuring ingredient contributions to tastes, e.g., the five basic tastes of sweet, salty, sour, bitter and umami. Other cost functions may take into account the proportions of specific ingredients used in one or more existing recipes deemed to be similar to the new recipe. If more than two cost functions are used, the ½ term in equations (2) and (3) may be replaced by a /1;x term, where x is the number of cost functions. If different cost functions are to contribute unequally as in equations (2') and (3'), the ½ term may be adjusted accordingly.

The process 400, which may be implemented using system 100, determines the proportions of constituents to be used in forming a given work product. In some embodiments the process 400 and system 100 are further configured to determine amounts of constituents to be used in forming the given work product.

Continuing with the example above for recipes, the work product analysis module 104 may use ingredient nutrition facts and other constituent properties to determine an average liquid and solid weight per portion in existing recipes $R^{(1)}, \ldots, R^{(n)}$. The liquid weights may be, for example, water weights or alcohol weights. The weights per portion for liquids and solids in the existing recipes are denoted $\omega_l$ and $\omega_s$, respectively. The standard deviations of weight per portion for liquids and solids are denoted $\sigma^l$ and $\sigma^s$, respectively.

To determine the amounts of ingredients to use in the new recipe, the proportion balancing module 106 determines a factor for which the new recipe reaches the average solid weight per portion when multiplied by the selected proportions of ingredients for the new recipe. Alternatively, the multiplication factor may be determined using a cost function $J^{portion}(f)$, determined according to $$J^{portion}(f) = \frac{1}{4(\sigma^l + \sigma^s)} \left( \sigma^s \left( f \sum_{i=0}^{m} \mu_i w_i^l - \omega^l \right)^2 + \sigma^l \left( f \sum_{i=0}^{m} \mu_i w_i^s - \omega^s \right)^2 \right) \quad (4)$$

where $w_i^l$ and $w_i^s$ are the percentages of liquid and solid in ingredient i. The proportion balancing module 106 may also infer the number of servings in the new recipe using similar techniques.

Although various aspects of the process 400 are described above in the context of selecting proportions of ingredients for recipes, embodiments of the invention are not limited solely to this context. For illustration, examples of selecting constituent proportions in two additional contexts are described below. It is to be appreciated, however, that these examples are not an exhaustive list of all possible contexts for embodiments of the invention. In addition, for clarity of illustration various aspects in the examples below are simplified.

The process 400 and/or system 100 may be used in the context of itinerary generation. A new travel itinerary, for example, may specify a number of events over a period of time, such as visiting historical sites, parks, museums, restaurants, etc. The new travel itinerary, however, may not specify information relating to the ordering of events, duration of events, etc. In addition, an existing itinerary may be missing some or all information relating to the ordering of events, duration of events, etc. Given a set of events for a travel itinerary, the process 400 and system 100 may utilize information from existing travel itineraries and properties of events in order to allocate relative proportions of time or actual blocks of time for events in the given travel itinerary. Existing travel itineraries may indicate average durations for certain types of events, such as museum visits, parks, theater performances, etc. Properties for individual events, such as museum visits, may indicate size, expected visit time, open hours, etc. The process 400 and/or system 100 may use an objective function to select the proportions and durations of events in the given travel itinerary using such information.

The process 400 and/or system 100 may also be used in the context of perfume generation. A new or novel perfume may specify a set of scents or odor sources which are to be used as components in manufacturing the new perfume without specifying exact amounts or proportions of such scents or odor sources. Alternately, an existing perfume plan may be missing some or all information relating to the amounts of proportions of scents or odor sources to be used in producing an existing perfume. Individual scents and odor sources may have properties relating to scent profile, olfactory pleasantness, etc. Scents and odor sources may also be clustered by type having particular common characteristics. For example, rose and lavender may be clustered as flower scents. The process 400 and/or system 100 may use an objective function to select the proportions and amounts of scents and odor sources to use for a new perfume or an existing perfume plan using such information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
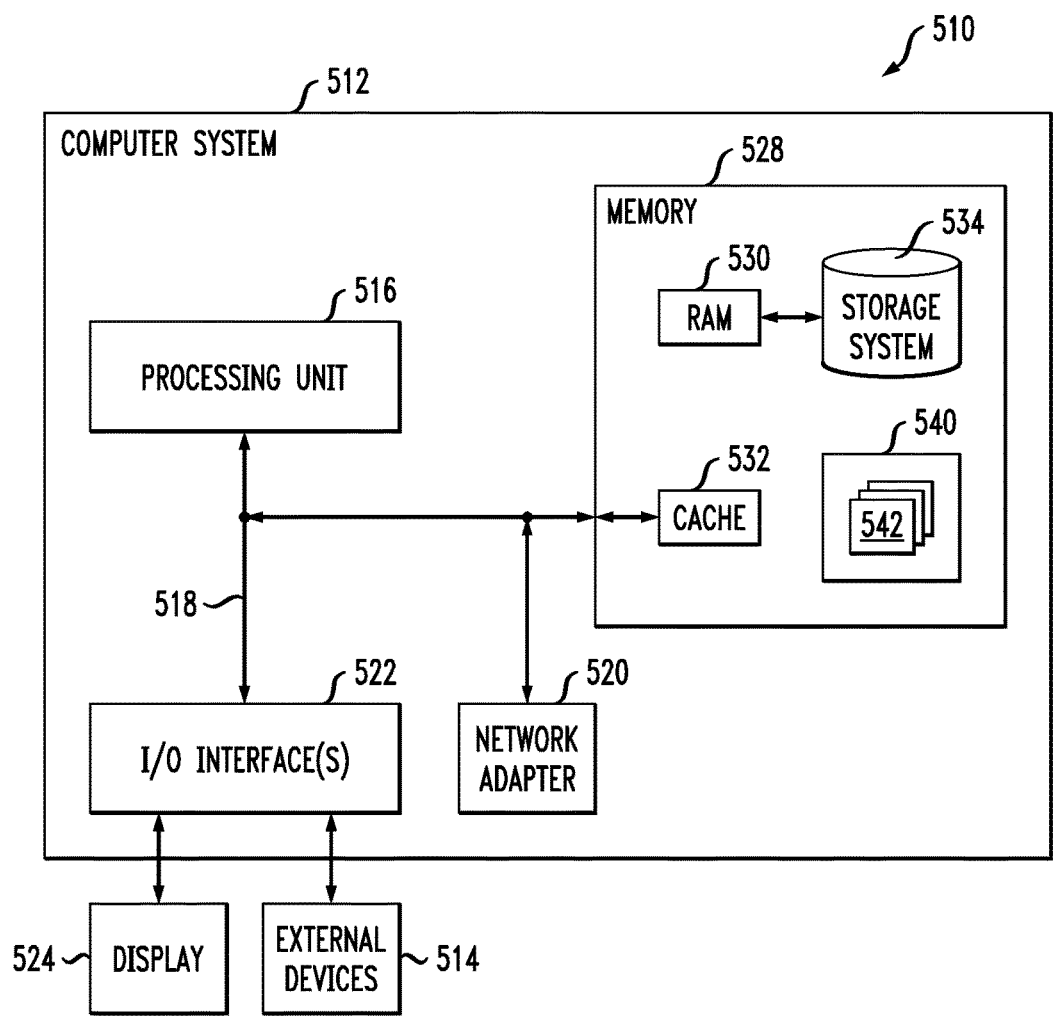
FIG. 5 depicts a computer system in accordance with which one or more components/steps of techniques of the invention may be implemented according to an embodiment of the invention.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via Input/output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples include, but are not limited to, microcode, device drivers, redundant processing units, external disk drive arrays, RAID systems, tape drives, and data archival storage systems, etc.

The flowchart and block diagrams in FIGS. 1-5 illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. In addition, particular features described above with respect to a particular embodiment of the invention are not necessarily limited solely to use in the particular embodiment described. Instead, a single embodiment may include features described above in the context of two or more different embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving a given work product plan specifying a set of constituents to be used in forming a given work product, each constituent having one or more properties, the given work product being associated with a given class of work products;
   obtaining information associated with one or more existing work product plans for one or more existing work products other than the given work product in the given class from a knowledge database;
   selecting proportions of the set of constituents to be used in forming the given work product based at least in part on distributions of characteristics associated with types of constituents used in forming existing work products other than the given work product in the given class and of properties of constituents used in forming existing work products other than the given work product in the given class; and
   generating an updated work product plan for the given work product specifying the selected proportions of the set of constituents to be used in forming the given work product;
   wherein selecting proportions of the set of constituents to be used in forming the given work product comprises:
      determining variations in the distributions of constituent types and constituent properties for constituents used in forming existing work products other than the given work product in the given class; and
      utilizing an objective function that assigns importance of constituent types and constituent properties inversely proportional to the variations in the distributions of constituent types and constituent properties for constituents used in forming existing work products other than the given work product in the given class;
   wherein the updated work plan is utilized to form the given work product; and
   wherein the receiving, obtaining, selecting and generating are performed by at least one processing device comprising a processor coupled to a memory.

2. The method of claim 1, wherein the information associated with the existing work product plans is clustered by work product class and constituents type.

3. The method of claim 1, wherein selecting proportions of the set of constituents comprises determining an average percentage and standard deviation for respective constituent types.

4. The method of claim 1, wherein selecting proportions of the set of constituents comprises determining an average percentage and standard deviation for respective properties of constituents.

5. The method of claim 1, wherein selecting portions of the set of constituents comprises minimizing the objective function, the objective function penalizing deviations from averages in the distributions of constituent types and constituent properties.

6. The method of claim 5, wherein the objective function comprises a first cost function for constituent types and a second cost function for constituent properties.

7. The method of claim 6, wherein the first cost function and the second cost function include first penalty contributions based on respective standard deviations in the distributions and second penalty contributions based on respective averages in the distributions.

8. The method of claim 7, wherein the first penalty contributions decrease as the standard deviations increase and the second penalty contributions increase as deviation from the averages increase.

9. The method of claim 6, wherein the first cost function utilizes averages of costs for the constituent types and the second cost function utilizes averages of costs for constituent properties.

10. The method of claim 6, wherein the first cost function utilizes weights assigned to costs for respective ones of the constituent types and the second cost function utilizes weights assigned to costs for respective ones of the constituent properties.

11. The method of claim 5, wherein the objective function is based on one or more constraints for constituent properties.

12. The method of claim 1, wherein selecting proportions of the set of constituents further comprises identifying amounts of the set of constituents to be used in forming the given work product.

13. The method of claim 12, wherein identifying the amounts of the set of constituents to be used in the given work product comprises computing average amounts of constituents used in forming the existing work products other than the given work product in the given class and determining a multiplication factor for reaching the average amounts using the selected proportions.

14. The method of claim 1, wherein the constituent properties are selected from a plurality of constituent properties based on the given work product and the given class.

15. The method of claim 1, wherein the given work product plan and the one or more existing work product plans comprise recipes, the given work product and the one or more existing work products comprise food dishes, the constituents comprises ingredients and the properties comprise nutrients.

16. The method of claim 15, wherein selecting proportions of the set of constituents comprises minimizing the objective function, the objective function comprising a sum of two or more cost functions, the two or more cost functions comprising a first cost function for nutrient distribution and a second cost function for ingredient type distribution.

17. The method of claim 16, wherein the two or more cost functions further comprise a third cost function measuring ingredient contribution to tastes.

18. The method of claim 1, wherein the given work product plan and the one or more existing work product plans comprise perfume plans, the given work product and the one or more existing work products comprise perfumes, the constituents comprises odor sources, and the properties comprise olfactory pleasantness metrics.

19. An article of manufacture comprising a computer readable storage medium for storing computer readable program code which, when executed, causes a computer to:
receive a given work product plan specifying a set of constituents to be used in forming a given work product, each constituent having one or more properties, the given work product being associated with a given class of work products;
obtain information associated with one or more existing work product plans for one or more existing work products other than the given work product in the given class from a knowledge database;
select proportions of the set of constituents to be used in forming the given work product based at least in part on distributions of characteristics associated with types of constituents used in forming existing work products other than the given work product in the given class and of properties of constituents used in forming existing work products other than the given work product in the given class; and
generate an updated work product plan for the given work product specifying the selected proportions of the set of constituents to be used in forming the given work product;
wherein selecting proportions of the set of constituents to be used in forming the given work product comprises:
determining variations in the distributions of constituent types and constituent properties for constituents used in forming existing work products other than the given work product in the given class; and
utilizing an objective function that assigns importance of constituent types and constituent properties inversely proportional to the variations in the distributions of constituent types and constituent properties for constituents used in forming existing work products other than the given work product in the given class; and
wherein the updated work plan is utilized to form the given work product.

20. An apparatus comprising:
a memory; and
a processor device operatively coupled to the memory and configured:
to receive a given work product plan specifying a set of constituents to be used in forming a given work product, each constituent having one or more properties, the given work product being associated with a given class of work products;
to obtain information associated with one or more existing work product plans for one or more existing work products other than the given work product in the given class from a knowledge database;
to select proportions of the set of constituents to be used in forming the given work product based at least in part on distributions of characteristics associated with types of constituents used in forming existing work products other than the given work product in the given class and of properties of constituents used in forming existing work products other than the given work product in the given class; and
to generate an updated work product plan for the given work product specifying the selected proportions of the set of constituents to be used in forming the given work product;
wherein the processor device is configured to select proportions of the set of constituents to be used in forming the given work product by:
determining variations in the distributions of constituent types and constituent properties for constituents used in forming existing work products other than the given work product in the given class; and
utilizing an objective function that assigns importance of constituent types and constituent properties inversely proportional to the variations in the distributions of constituent types and constituent properties for constituents used in forming existing work products other than the given work product in the given class; and
wherein the updated work plan is utilized to form the given work product.

* * * * *